US010951362B2

(12) United States Patent
Bendlin et al.

(10) Patent No.: US 10,951,362 B2
(45) Date of Patent: Mar. 16, 2021

(54) HYBRID AUTOMATIC REPEAT REQUEST AND SCHEDULING FOR WIRELESS CELLULAR SYSTEMS WITH LOCAL TRAFFIC MANAGERS

(71) Applicant: AT&T Intellectual Property I, L.P., Atlanta, GA (US)

(72) Inventors: Ralf Bendlin, Cedar Park, TX (US); Xiaoyi Wang, Austin, TX (US); Andrew Thornburg, Austin, TX (US); Thomas Novlan, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/366,254

(22) Filed: Mar. 27, 2019

(65) Prior Publication Data

US 2020/0052829 A1 Feb. 13, 2020

Related U.S. Application Data

(60) Provisional application No. 62/717,186, filed on Aug. 10, 2018.

(51) Int. Cl.
*G08C 25/02* (2006.01)
*H04L 1/18* (2006.01)
(Continued)

(52) U.S. Cl.
CPC .......... *H04L 1/1812* (2013.01); *H04L 1/1657* (2013.01); *H04W 72/042* (2013.01); *H04W 76/11* (2018.02); *H04W 76/14* (2018.02)

(58) Field of Classification Search
CPC ... H04W 76/14; H04W 72/042; H04W 76/11; H04W 88/023; H04W 76/40;
(Continued)

(56) References Cited

U.S. PATENT DOCUMENTS 8,385,931 B2   2/2013  Landstrom et al.
8,582,638 B2  11/2013  Earnshaw et al.
(Continued)

FOREIGN PATENT DOCUMENTS

CN   107872888 A    4/2018
EP   3 282 719 A1   2/2018
(Continued)

OTHER PUBLICATIONS

5G Americas., "V2X Cellular Solutions," URL: http://www.5gamericas.org/files/2914/7769/1296/5GA_V2X_Report_FINAL_for_upload.pdf, Oct. 2016, 37 pages.
(Continued)

*Primary Examiner* — Guerrier Merant
(74) *Attorney, Agent, or Firm* — Amin, Turocy & Watson, LLP

(57) ABSTRACT

The disclosed subject matter is directed towards scheduling and Hybrid Automatic Repeat Request (HARQ) operations by which nodes in a three party communication system can communicate. To schedule a data transmission from a transmitter node to receiver node(s), a local manager/scheduler node sends common downlink control information to the transmitter and receiver nodes. Via a scheduling request, the transmitting node can request the scheduling of the data transmission by the local manager node. The technology facilitates unicast and broadcast/multicast data transmissions; for a unicast data transmission, the scheduling request identifies the receiving node. The transmitting node can explicitly acknowledge reception of the downlink control information to the local manager node, or the local manager node can detect the data transmission, when it occurs, as an implicit acknowledgment that the common downlink control information was successfully received.

20 Claims, 12 Drawing Sheets

(51) Int. Cl.
*H04L 1/16* (2006.01)
*H04W 76/14* (2018.01)
*H04W 76/11* (2018.01)
*H04W 72/04* (2009.01)

(58) Field of Classification Search
CPC ......... H04W 72/1289; H04W 72/0406; H04W 72/0413; H04W 72/044; H04W 4/40; H04W 88/08; H04W 72/14; H04W 72/0446; H04W 74/0833; H04L 1/1812; H04L 1/1657; H04L 1/0003; H04L 1/1861; H04L 1/001; H04L 47/34; H04L 5/0055; H04L 1/18; H04L 5/14; H04L 5/001; H04L 1/14
See application file for complete search history.

(56) References Cited

U.S. PATENT DOCUMENTS

| | | | |
|---|---|---|---|
| 8,682,376 | B2 | 3/2014 | Franceschini et al. |
| 9,351,310 | B2 | 5/2016 | Lagerqvist et al. |
| 9,370,001 | B2* | 6/2016 | Kim ............... H04W 72/1289 |
| 9,391,736 | B2 | 7/2016 | Nayeb Nazar et al. |
| 9,450,714 | B2 | 9/2016 | Hwang et al. |
| 9,756,653 | B2 | 9/2017 | Kim et al. |
| 9,768,942 | B2* | 9/2017 | Golitschek Edler von Elbwart ............ H04W 72/0446 |
| 9,844,071 | B2 | 12/2017 | Ostergaard et al. |
| 10,111,246 | B2 | 10/2018 | Zhang et al. |
| 10,159,061 | B2 | 12/2018 | Zhao et al. |
| 10,165,556 | B2 | 12/2018 | Chu et al. |
| 10,595,363 | B2 | 3/2020 | Wang et al. |
| 2011/0134827 | A1 | 6/2011 | Hooli et al. |
| 2012/0044890 | A1 | 2/2012 | Jen |
| 2012/0287844 | A1 | 11/2012 | Ophir et al. |
| 2013/0195026 | A1 | 8/2013 | Johnsson et al. |
| 2013/0208653 | A1 | 8/2013 | Morioka et al. |
| 2013/0322413 | A1 | 12/2013 | Pelletier et al. |
| 2014/0036704 | A1 | 2/2014 | Han et al. |
| 2014/0078971 | A1 | 3/2014 | Bontu et al. |
| 2014/0171062 | A1 | 6/2014 | Fallgren et al. |
| 2014/0177540 | A1* | 6/2014 | Novak ............... H04W 72/0406 370/329 |
| 2014/0177586 | A1 | 6/2014 | Jang et al. |
| 2014/0256369 | A1 | 9/2014 | Ji et al. |
| 2015/0146633 | A1 | 5/2015 | Kalhan |
| 2015/0181587 | A1 | 6/2015 | Yang et al. |
| 2015/0271755 | A1 | 9/2015 | Karri et al. |
| 2016/0205714 | A1 | 7/2016 | Morita et al. |
| 2016/0295565 | A1 | 10/2016 | Kim et al. |
| 2016/0345167 | A1 | 11/2016 | Li et al. |
| 2016/0374051 | A1 | 12/2016 | Morita |
| 2017/0006586 | A1 | 1/2017 | Gulati et al. |
| 2017/0013466 | A1* | 1/2017 | Xu ................. H04W 16/10 |
| 2017/0026997 | A1* | 1/2017 | Moulsley ............ H04L 1/001 |
| 2017/0048905 | A1 | 2/2017 | Yun et al. |
| 2017/0064731 | A1 | 3/2017 | Wang et al. |
| 2017/0086028 | A1 | 3/2017 | Hwang et al. |
| 2017/0086114 | A1 | 3/2017 | Jung et al. |
| 2017/0134080 | A1 | 5/2017 | Rahman et al. |
| 2017/0135105 | A1 | 5/2017 | Li et al. |
| 2017/0201461 | A1 | 7/2017 | Cheng et al. |
| 2017/0208568 | A1 | 7/2017 | Nam et al. |
| 2017/0245245 | A1 | 8/2017 | Kim et al. |
| 2017/0273094 | A1 | 9/2017 | Cheng et al. |
| 2017/0280469 | A1 | 9/2017 | Park et al. |
| 2017/0289733 | A1 | 10/2017 | Rajagopal et al. |
| 2017/0295601 | A1 | 10/2017 | Kim et al. |
| 2017/0331670 | A1 | 11/2017 | Parkvall et al. |
| 2017/0339676 | A1 | 11/2017 | Belghoul et al. |
| 2017/0353971 | A1 | 12/2017 | Gupta et al. |
| 2017/0366311 | A1 | 12/2017 | Iyer et al. |
| 2018/0007606 | A1 | 1/2018 | Lee et al. |
| 2018/0035435 | A1 | 2/2018 | Gupta et al. |
| 2018/0041956 | A1 | 2/2018 | Abraham et al. |
| 2018/0042023 | A1 | 2/2018 | Sheng |
| 2018/0049084 | A1 | 2/2018 | Lee et al. |
| 2018/0049219 | A1 | 2/2018 | Gupta et al. |
| 2018/0049274 | A1 | 2/2018 | Kim et al. |
| 2018/0069928 | A1 | 3/2018 | Martin et al. |
| 2018/0070369 | A1 | 3/2018 | Papasakellariou |
| 2018/0076839 | A1 | 3/2018 | Baghel et al. |
| 2018/0092122 | A1 | 3/2018 | Babaei et al. |
| 2018/0124574 | A1 | 5/2018 | Byun et al. |
| 2018/0184270 | A1 | 6/2018 | Chun et al. |
| 2018/0192405 | A1 | 7/2018 | Gong et al. |
| 2018/0199317 | A1 | 7/2018 | Hwang et al. |
| 2018/0213554 | A1 | 7/2018 | Zeng et al. |
| 2018/0220398 | A1 | 8/2018 | Wilson et al. |
| 2018/0220415 | A1 | 8/2018 | Yin et al. |
| 2018/0227942 | A1 | 8/2018 | Hwang et al. |
| 2018/0227949 | A1 | 8/2018 | Tiirola et al. |
| 2018/0234973 | A1 | 8/2018 | Lee et al. |
| 2018/0359773 | A1 | 12/2018 | Tesanovic |
| 2019/0068996 | A1 | 2/2019 | Ananthanarayanan et al. |
| 2019/0246421 | A1* | 8/2019 | Zhou ............... H04W 72/1289 |
| 2020/0022089 | A1* | 1/2020 | Guo ............... H04B 17/327 |
| 2020/0029318 | A1* | 1/2020 | Guo ............... H04W 88/023 |
| 2020/0092685 | A1 | 3/2020 | Fehrenbach et al. |
| 2020/0106566 | A1* | 4/2020 | Yeo ............... H04W 28/04 |
| 2020/0120458 | A1 | 4/2020 | Aldana et al. |

FOREIGN PATENT DOCUMENTS

| | | | |
|---|---|---|---|
| KR | 20180039472 | A | 4/2018 |
| WO | 2016/106713 | A1 | 7/2016 |
| WO | 2017/007104 | A1 | 1/2017 |
| WO | 2017/126266 | A1 | 7/2017 |
| WO | 2017/133646 | A1 | 8/2017 |
| WO | 2017/162040 | A1 | 9/2017 |
| WO | 2017/164141 | A1 | 9/2017 |
| WO | 2017/171528 | A1 | 10/2017 |
| WO | 2017/171909 | A1 | 10/2017 |
| WO | 2017/173133 | A1 | 10/2017 |
| WO | 2017/176097 | A1 | 10/2017 |
| WO | 2017196215 | A1 | 11/2017 |
| WO | 2018/031623 | A1 | 2/2018 |
| WO | 2018/059701 | A1 | 4/2018 |
| WO | 2018/062454 | A1 | 4/2018 |
| WO | 2018/062948 | A1 | 4/2018 |
| WO | 2018/064179 | A1 | 4/2018 |
| WO | 2018/067400 | A1 | 4/2018 |
| WO | 2018/080568 | A1 | 5/2018 |
| WO | 2018/080629 | A1 | 5/2018 |
| WO | 2018/084520 | A1 | 5/2018 |
| WO | 2018/084590 | A1 | 5/2018 |
| WO | 2018/112322 | A2 | 6/2018 |
| WO | 2018/113947 | A1 | 6/2018 |
| WO | 2018/139892 | A1 | 8/2018 |
| WO | 2018/144899 | A1 | 8/2018 |
| WO | 2018/145067 | A1 | 8/2018 |
| WO | 2018/147996 | A1 | 8/2018 |
| WO | 2019177783 | A1 | 9/2019 |

OTHER PUBLICATIONS

Ruckebusch et al., "WiSHFUL: enabling coordination solutions for managing heterogeneous wireless Netorks", URL: https://biblio.ugent.be/publication/8541159/file/8541162.pdf, IEEE Communications Magazine, vol. 55, No. 9, 2017, pp. 1-9.

Zervas et al., "Service-Oriented Multigranular Optical Network Architecture for Clouds", URL: http://repository.essex.ac.uk/3757/1/05594024.pdf, Journal of Optical COmmunications and Networking, IEEE/OSA, vol. 2, No. 10, 2010, pp. 883-891.

Sykora et al., "Cooperative Strategies and Networks", URL: https://pdfs.semanticscholar.org/912f/4ab9c15ce35c16e9569c5680ff471fd0cb1c.pdf, Cooperative radio communications for green smart environments, River Publishers, 2016, pp. 271-304.

Dieudonne et al., "Deliverable D2.5 Report on 5G evolution (third revision)", URL: https://www.triangle-project.eu/wp-content/uploads/

(56) References Cited

OTHER PUBLICATIONS

2018/04/TRIANGLE_Deliverable_D2-5.pdf, Project: H2020-ICT-688712, Ver. 1.0, Mar. 2018, 83 pages.
Friedman, Larry, "SimpliciTI: Simple Modular RF Network Specification", URL: http://vip.gatech.edu/wiki/images/a/ad/SimpliciTI+Specification.pdf, Version 1.09, 2007, 34 pages.
Apostolaras et al., "Evolved User Equipment for Collaborative Wireless Backhauling in Next Generation Cellular Networks", URL: http://nitlab.inf.uth.gr/NITlab/papers/[Apostolaras [SECON15] [Evolved%20UEs].pdf, 12th Annual IEEE International Conference on Sensing, Communication, and Networking (SECON), IEEE, 2015, 9 pages.
Tullberg et al., "METIS System Concept: The Shape of 5G to Come", URL: https://pdfs.semanticscholar.org/f0cb/be302eed502ff98acdf557649ce23c21c111.pdf, IEEE Communications Magazine, 2015, 13 pages.
Non-Final Office Action received for U.S. Appl. No. 15/923,958 dated Apr. 15, 2019, 39 pages.
Final Office Action received for U.S. Appl. No. 15/923,958 dated Sep. 6, 2019, 49 pages.
Non-Final Office Action received for U.S. Appl. No. 16/004,811 dated Nov. 25, 2019, 43 pages.
Non-Final Office Action received for U.S. Appl. No. 15/923,958 dated Feb. 26, 2020, 40 pages.
International Search Report and Written Opinion received for International Application Serial No. PCT/US2020/012269 dated Apr. 17, 2020, 18 pages.
AT&T: "Resource allocation mechanism", 3GPP Draft; R1-1812872 Resource Allocation Mechanism, 3rd Generation Partnership Project (3GPP), Mobile Competence Centre; 650, Route Des Lucioles; F-06921 Sophia-Antipolis Cedex; France, vol. RAN WG1, No. Spokane, USA; Nov. 12, 2018-Nov. 16, 2018, Nov. 11, 2018, (Nov. 11, 2018), XP051554834, Retrieved from the Internet: URL:http://www.3gpp.org/ftp/Meetings%5F3GPP%5FSYNC/RAN1/Docs/R12D1812872%2Ezip [retrieved on Nov. 11, 2018] sections 1-6.
International Search Report and Written Opinion received for PCT Application Serial No. PCT/US2019/020150 dated Jun. 5, 2019, 17 pages.
Final Office Action received for U.S. Appl. No. 15/923,958 dated Jun. 25, 2020, 48 pages.
Non-Final Office Action received for U.S. Appl. No. 16/366,347 dated Jun. 8, 2020, 63 pages.
Non-Final Office Action received for U.S. Appl. No. 16/245,635 dated Aug. 3, 2020, 63 pages.
AT&T: "Sidelink based synchronization mechanism", 3GPP RAN WG1 Draft, R1-1809068 (Aug. 11, 2018), Gothenburg, Sweden, Aug. 20-24, 2018, [http://www.3gpp.org/ftp/tsg%5Fran/WG1%5FRL1/TSGR1%5F94/Docs/R1%2D1809068%2Ezip], sections 1-6.
International Preliminary Report on Patentability received for PCT Application Serial No. PCT/US2019/020150 dated Oct. 1, 2020, 11 pages.
Non-Final Office Action received for U.S. Appl. No. 15/923,958 dated Dec. 15, 2020, 56 pages.
Final Office Action received for U.S. Appl. No. 16/366,347 dated Dec. 24, 2020, 44 pages.

\* cited by examiner

HYBRID AUTOMATIC REPEAT REQUEST AND SCHEDULING FOR WIRELESS CELLULAR SYSTEMS WITH LOCAL TRAFFIC MANAGERS

CROSS-REFERENCE TO RELATED APPLICATIONS

This application is a non-provisional of U.S. Provisional Patent Application No. 62/717,186, filed on Aug. 10, 2018 entitled "HYBRID AUTOMATIC REPEAT REQUEST AND SCHEDULING PROCEDURES FOR WIRELESS CELLULAR SYSTEMS WITH LOCAL TRAFFIC MANAGERS." The entirety of the aforementioned application is hereby incorporated herein by reference.

TECHNICAL FIELD

The subject application is related to wireless communication systems, and, for example, to fifth generation (5G, sometimes referred to as New Radio (NR)) cellular wireless communications systems in which local transmissions are scheduled by a local manager.

BACKGROUND

In traditional wireless cellular communications systems, a given geographic area is served by a single base station. The range of its transmitter (the "coverage") determines the "cell," which corresponds to the geographic area in which a user equipment (UE) can be served by the base station. By arranging a plurality of base stations in such a way that their coverage areas (the cells), partially overlap, ubiquitous coverage can be achieved in which user equipment can move through the network and at any given time be served by one base station. When the user equipment travels towards the edge of one base station's coverage area and into the coverage area of another base station, mobility procedures commonly referred to as "handovers" provide seamless connectivity during the time when the user equipment is disconnecting from the first base station and connecting to the second base station.

Thus, at any given time, a user equipment is served by a single base station, whereby control channel and data channel transmissions are transmitted and received by the same pair of nodes. For example, both downlink shared channel and uplink shared channel transmissions are scheduled by a base station, whereby for the downlink transmissions the base station is the transmitter and the user equipment (UE) is the receiver, whereas for the uplink transmissions, the UE is the transmitter and the base station is the receiver.

In next-generation wireless cellular communications systems, new services, such as vehicular services, are changing this paradigm. For example, sidelink technology provides for local (e.g., vehicle-to-vehicle) traffic to be managed by a local traffic manager, referred to as a "Node-S," which can perform scheduling between a transmitter node ("Node-T") and a receiver node ("Node-R"). The sidelink comprises an interface between two user equipments, in contrast to the downlink and uplink interfaces between a base station and a user equipment and a user equipment and a base station, respectively.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
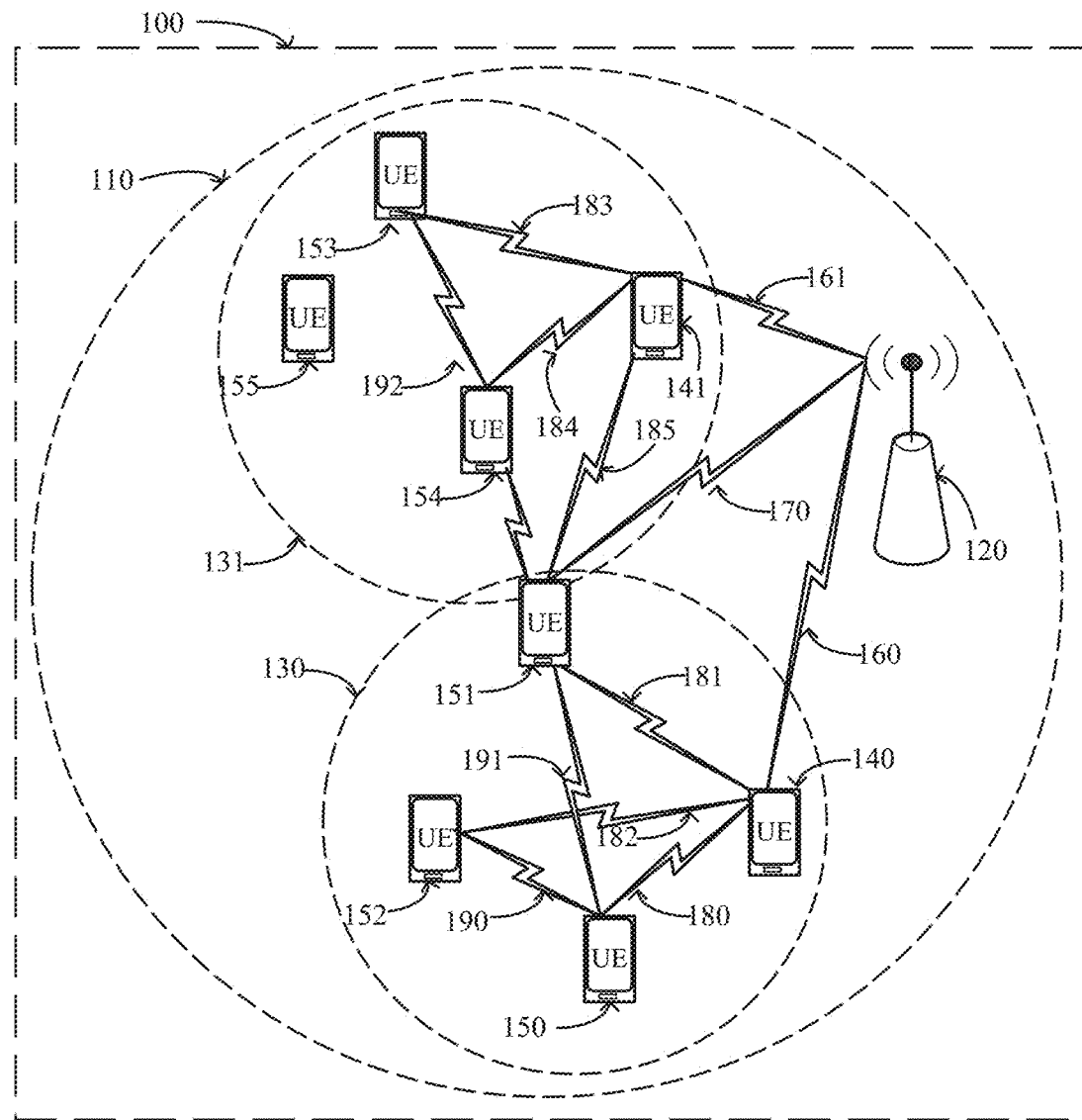
FIG. 1 illustrates an example wireless three-party communication system including scheduling nodes, transmitting nodes and receiving nodes that can communicate via sidelink transmissions, in accordance with various aspects and embodiments of the subject disclosure.

Various embodiments of disclosed herein are directed towards scheduling technologies and Hybrid Automatic Repeat Request (HARQ) technologies that facilitate sidelink communications. In one aspect, a Node-S (e.g., a scheduler/ local manager node) sends common downlink control information (DCI) to a transmitting node (Node-T) and receiving node(s), i.e., one or more Node-R(s). Transmission and reception takes place via sidelink interfaces between the user equipments. Note that "downlink control information" or "DCI" as used herein is not to be construed in any limiting sense. For example, downlink control information or DCI, when used in a Sidelink-related environment, such as with a Node-S, a Node-T and a Node-R, can be alternatively referred to as "Sidelink Control Information" (or "SCI"), e.g., as referred to in RAN1 (Radio Access Network Layer 1) specification(s). Thus, as used herein, downlink control information/DCI can be considered interchangeable with Sidelink Control Information/SCI, unless indicated otherwise by the usage context.

Described herein is technology that lets a Node-T acknowledge reception of the downlink control information; (note that in other state-of-the-art cellular communications systems, such downlink control information is not acknowledged). Implicit and explicit acknowledgement of reception of the downlink control information by the Node-T are described herein.

Note further that downlink control information and associated data are transmitted from two different nodes (unlike other state-of-the-art cellular communications systems), namely the downlink control information is transmitted by the Node-S, whereas the data is transmitted by the Node-T. Unicast and broadcast schemes are described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

As exemplified in FIG. 1, a wireless cellular communications system 100 is depicted. A base station 120 provides coverage in geographic area 110 comprising the cell. Air interfaces 160, 161, 170 provide downlink and uplink communication links for UEs 140, 141, 150, respectively. Note that all UEs 140, 141, 150, 151, 152, 153, 154, 155 can be assumed to have uplink/downlink communication links with base station 120, although this is not expressly depicted in FIG. 1 for purposes of readability.

Air interfaces 180, 181, 182, 183, 184, 185, 190, 191, 192 provide sidelink connectivity between two given UEs. A local manager, referred to herein as Node-S, locally controls transmissions on the sidelink within an area (or other grouping) associated with the Node-S. In the example of FIG. 1, a Node-S 140 controls sidelink transmissions in area 101, and a Node-S 141 controls sidelink transmissions in area 131. In general, a Node-S, such as the Node-S 140, sends common downlink control information (DCI) to a transmitting node (Node-T, such as the node 150) and the receiving node(s), i.e., one or more Node-R(s), such as the node 152. Transmission and reception thus occurs on the sidelink between a plurality of UEs.

Described herein is a mechanism that lets the Node-T acknowledge reception of the downlink control information; (note that in contemporary cellular communications systems, downlink control information is not acknowledged). Also, in contrast to contemporary cellular communications systems, the downlink control information and associated data are transmitted from two different nodes. More particularly, the downlink control information is transmitted by the Node-S 140, whereas data is transmitted by the Node-T 150. Unicast, multicast and broadcast schemes are implemented. Implicit and explicit acknowledgement of the downlink control information by a Node-T are described herein.

In one embodiment, a common downlink control information is sent to the transmitting (Node-T) and receiving (Node-R) nodes. For example, the Node-S 140 may send downlink control information to the nodes 150, 151, 152 via the sidelinks 180, 181, 182, whereby Node-T 150 subsequently sends data to nodes 151 and 152 via the sidelinks 190, 191. The nodes 151 and 152 in this example are each referred to as a Node-R, because the Node-T 150 in this example transmits to a plurality of Node-Rs; this scenario is called the broadcast or multicast scenario. In another example, the Node-S 141 may send downlink control information to the nodes 153, 154 via sidelinks 183,184 whereby the Node-T 153 subsequently sends data to the Node-R 154 via sidelink 192, e.g., in a unicast transmission.

Note that in this example, the local manager nodes 140, 141, namely the Node-S 140 and the Node-s 141 in the system 100 are configured to be local managers by the base station 120 via links 160, 161, whereby any node can transmit or receive via a sidelink controlled by at least one Node-S. Hence, whether a node is transmitting (in the Node-T state) or receiving (in the Node-R state) is dynamically controlled by a Node-S, based on the downlink control information. Note that it is feasible for a Node-S to be elected as a local (group) manager by a group of user equipment nodes without a base station configuration, at least temporarily.

Figure 2:
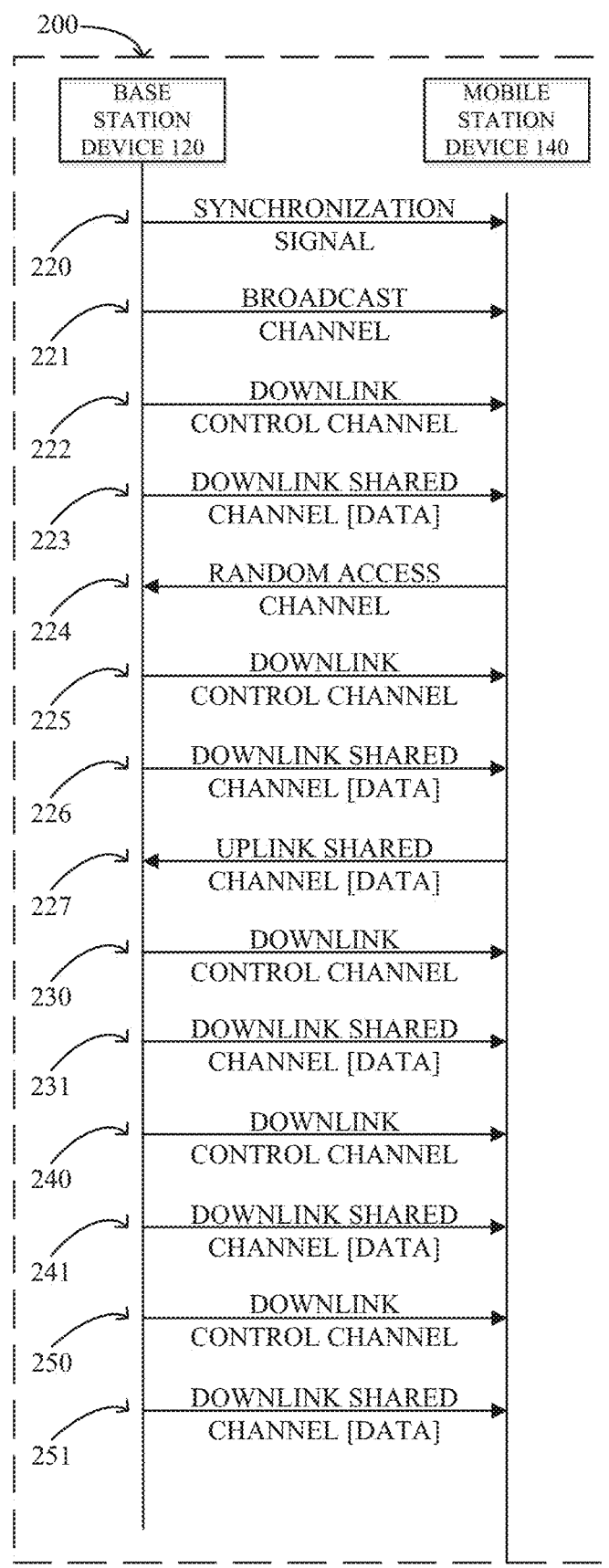
FIG. 2 illustrates an example timing diagram showing communications between a base station and a mobile station device, such as a local manager device, in accordance with various aspects and embodiments of the subject disclosure.

Now referring to FIG. 2, a UE 140 may receive a synchronization signal 220 from a base station 120. The synchronization signal allows the UE 140 to become time and frequency synchronized with base station 120 such that UE 140 can receive waveforms carrying information from base station 120. The synchronization signal may also convey information needed to receive the broadcast channel in 221. Amongst other data, information carried on the broadcast channel configures the UE to receive a downlink control channel 222 for scheduling a downlink shared channel 223. Data transmitted via the downlink shared channel configures the UE to initiate a random access procedure by transmitting a random access channel in 224. The base station schedules a random access response by means of a downlink control channel 225 carried on another downlink shared channel 226. The random access response contains a scheduling assignment and a timing advance for the UE to transmit the first uplink shared channel transmission in 227. The uplink shared channel conveys a user ID. In case of contention resolution during the random access procedure, base station 120 schedules another downlink control channel 230 scheduling a downlink shared channel 231 to resolve contention. Yet another downlink control channel 240 schedules a downlink shared channel 241 to initiate configuration of UE 140 for communication with base station 120. Once UE 140 is fully configured for bi-directional and secure communication with base station 120 via air interface 160, base station 120 sends yet another downlink control channel 250 scheduling a downlink shared channel 251 to initiate configuration of UE 140 as a Node-S.

In one or more implementations, base station 120 configures each Node-S 140, 141 with orthogonal resource pools. Resources are defined in the time and frequency domain. For example, in a wireless communications system employing orthogonal frequency-division multiple access (OFDMA) different Node-S may be assigned different subcarrier indices (frequency domain) and OFDM symbols (time domain) for data transmission. Similarly, the same or different subcarrier indices and OFDM symbols may be configured for control channel transmissions. For control channel transmissions, however, identical time/frequency resources can be configured for multiple Node-Ss, whereby each Node-S is assigned a different search space for control channel transmissions within the identical time/frequency resources. Additional resources may be configured by base station 120 for each Node-S 140, 141, e.g., for physical random access channel (PRACH) and physical uplink control channel (PUCCH) transmissions. These may be used by a Node-S to send scheduling requests or other uplink control information (UCI) such as channel state information (CSI) feedback or HARQ acknowledgements.

Similarly, the base station 120 configures UEs 150, 151, 152, 153, 154, 155 for communication via sidelinks. Unlike Node-S UEs, which are configured by base station 120 as a Node-S via dedicated signaling (e.g. to configure the orthogonal resource pools and search spaces), UEs that transmit and receive via a sidelink but are not configured as a local manager/Node-S—that is, these nodes are controlled by a Node-S rather than being configured as one—can be configured for sidelink communication under the control of a local manager via common signaling. In particular, a given node that is not a Node-S is aware of the resource pools of the Node-S within cell 110. In one embodiment, these nodes are configured by common broadcast signaling from the base station 120, however, configuration by dedicated messages is not precluded. For example, sidelink information including the resource pools of all Node-S in 110 can be included as part of the radio resource control (RRC) setup or reconfiguration of a node 150, 151, 152, 153, 154, 155. Because a given node that is not a Node-S is aware of the resource pools of the one or more Node-S in 110, such a node can receive downlink control information from one or more Node-S in its proximity. This is illustrated in FIG. 1 for UE 151, which can receive from a first Node-S 140 via a first sidelink 181 and from a second Node-S 141 via a second sidelink 185, respectively.

As mentioned herein, the nodes 150, 151, 152, 153, 154, 155 are configured to receive from the Node-S 140, 141 by base station 120. Hence, when monitoring for downlink control information, a given node 150, 151, 152, 153, 154, 155 potentially can receive downlink control information from multiple Node-Ss. This allows for a seamless transition between a local area 130 controlled by a first local manager Node-S 140 and a local area 131 controlled by a second local manager Node-S 141. In particular, such a transition does not require a handover or any other signaling from base station 120.

Described herein is facilitating data transmission via the sidelinks in a wireless communications system 100, whereby the communication via the sidelink is controlled by local traffic managers Node-S 140, 141. Note that in traditional state-of-the-art communications systems, control channel and data channel transmissions are transmitted and received by the same pair of nodes. For example, in FIG. 2, both downlink shared channel and uplink shared channel transmissions are scheduled by base station 120, whereby for the downlink base station 120 is the transmitter and UE 140 is the receiver, and whereby for the uplink, UE 140 is the transmitter and base station 120 is the receiver. Even for the state-of-the-art sidelink, e.g., in the device-to-device (D2D) feature of the Long-Term Evolution (LTE) standard defined by the Third Generation Partnership Project (3GPPP), the control and data transmissions occur between two UEs. In the embodiments described herein, and unlike prior art that exclusively deals with pairs of nodes, a three-party communication sidelink design is provided. The HARQ and scheduling procedures of a three-party communication sidelink design are described herein.

Unlike traditional D2D or vehicle-to-vehicle (V2V) communications systems, which deal with pairs of nodes, in which for a given node the sidelink control channel and the sidelink data channel transmissions occur between the same pair of nodes, in one or more embodiments described herein, downlink control information is transmitted by a Node-S and data is transmitted by a Node-T and received by a Node-R. Generally, Node-S, Node-T, and Node-R are three distinct nodes, however, a scenario in which a Node-S also acts as a transmitter Node-T are not precluded. Furthermore, as discussed herein, whether a node acts as transmitter (Node-T) or receiver (node-R) is generally controlled by the Node-S, depending on whether the downlink control information sent by Node-S and received by a given node instructs the receiving node to transmit (in which case it acts as Node-T) or to receive (in which case it acts as Node-R).

Figure 3:
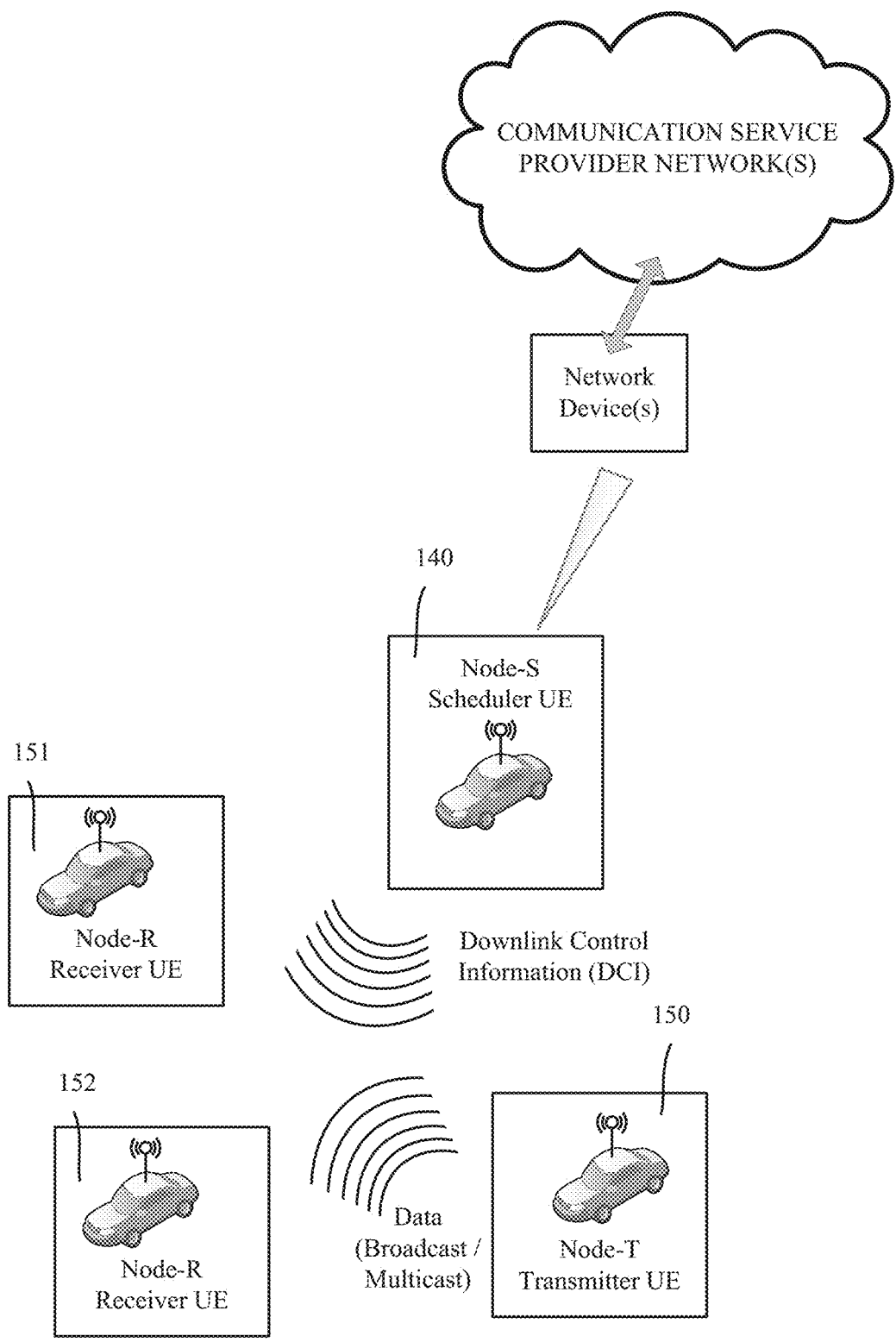
FIG. 3 is an example block diagram representing a local manager device (scheduler node device) scheduling a broadcast/multicast transmission over sidelink from a transmitter node to receiver nodes, in accordance with various aspects and embodiments of the subject disclosure.

For example, as generally represented in FIG. 3, the Node-S 140 sends downlink control information (via sidelinks 180, 181, 182, FIG. 1) to the nodes 150 and 152 (as well as the node 151, not shown in FIG. 3). The downlink control information instructs the node 150 to act as a transmitting Node-T and instructs nodes 151, 152 to act as receiver Node-R nodes. This dynamic instruction subsequently allows the Node-T 150 to broadcast/multicast data to the nodes 151, 152 (via sidelinks 190, 191, FIG. 1).

Figure 4:
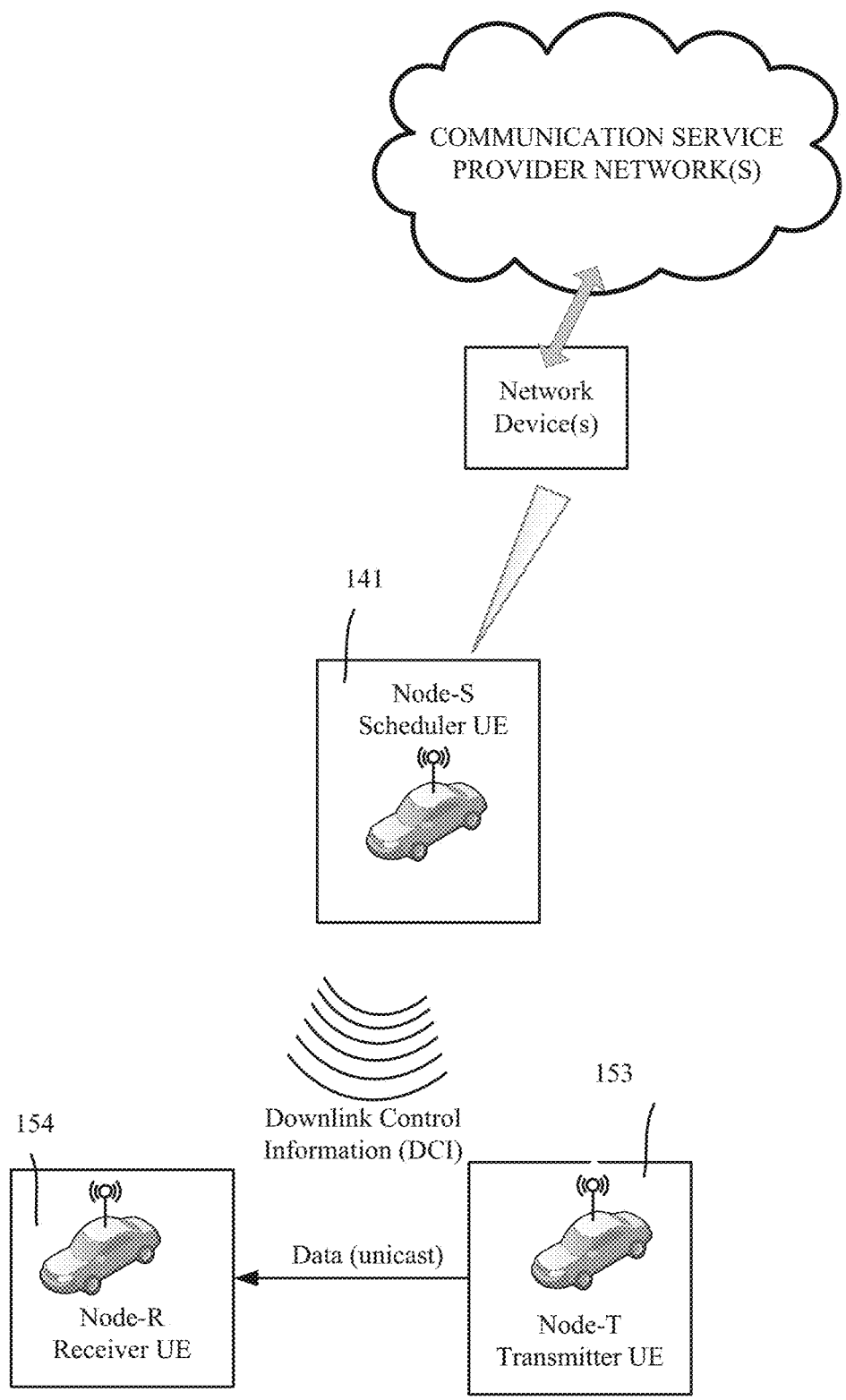
FIG. 4 is an example block diagram representing a local manager device (scheduler node device) scheduling a unicast transmission over sidelink from a transmitter node to a receiver node, in accordance with various aspects and embodiments of the subject disclosure.

Similarly, as represented in FIG. 4, the Node-S 141 can send downlink control information via sidelinks 183, 184 to nodes 153 and 154, instructing node 153 to act as Node-T and instructing nodes 154 to act as Node-R. This dynamic instruction subsequently allows Node-T 153 to send data to node 154 via sidelink 192 (FIG. 1). In this scenario, the data transmission between the nodes 153 and 154 is referred to as unicast, i.e., between a transmitter and receiver pair of UEs, unlike in the previous example of FIG. 3 where one UE (the Node-T) sends data to a plurality of receiver UEs (Node-R).

The downlink control information is generally transmitted on a downlink control channel, e.g., the physical downlink control channel (PDCCH) in the 3GPP LTE standard. Unicast and multicast/broadcast transmissions of downlink control information are realized by different radio network temporary identifiers (RNTIs). Returning to FIG. 2, downlink shared channel transmission 223 is a broadcast transmission. In 3GPP LTE, this transmission carries system information (SI) such as the System Information Block 1 (SIB1) and the System Information Block 2 (SIB2). In this example, the downlink shared channel 223 is scheduled by a PDCCH 222 whose cyclic redundancy check (CRC) bits are scrambled with the SI-RNTI. The downlink shared channel transmission 241, on the other hand, is a unicast transmission. In 3GPP LTE, this transmission is scheduled by a PDCCH 240 whose cyclic redundancy check (CRC) bits are scrambled with the C-RNTI. The C-RNTI is unique to the UEs in cell 110 (FIG. 1) and is configured by base station 120 via dedicated RRC signaling. Because only the base station 120 can send downlink transmissions, in prior systems it suffices to indicate a receiver in the downlink control information. For unicast transmissions, this is done by the C-RNTI, which indicates for which UE in cell 110 a given PDCCH is intended. For multicast/broadcast transmissions, a common RNTI is used. Hence, the PDCCH is still send by a dedicated node, the base station 120, and the common RNTI indicates a plurality of UEs as receivers. Nevertheless, in each case the downlink control information/RNTI only informs the UE about the intended receiver.

For three-party communications systems as described herein, downlink control information is described that indicates both the transmitting and the receiving nodes. In other words, as generally represented in FIGS. 3 and 4, the same downlink control information is received by the transmitter (Node-T) 150 and the receiver or receivers (Node-R) 151 and 152 (FIG. 3) or 154 (FIG. 4). Note that in contrast, in the uplink or downlink scenario or in the existing D2D sidelink, the downlink control information only signals which node transmits (e.g., uplink) or receives (e.g., downlink), whereas the other node (the receiving node in the uplink and the transmitting node in the downlink) is implicit.

Thus, in one or more embodiments described herein, a common RNTI (radio network temporary identifiers) is defined for sidelink transmissions. In one example, the one or more Node-S(s) in the cell 110 share the same RNTI. This is possible if resource pools are strictly orthogonal. Alternatively, each Node-S may be configured with its own RNTI. Moreover, the downlink control information transmitted by a Node-S may contain a Tx-UID (transmitting node unique identifier) field and an Rx-UID (receiving node unique identifier) field, whereby the Tx-UID field determines the transmitting node and the Rx-UID field informs the receiving node(s). For the broadcast/multicast scenario, only a Tx-UID field may be part of the downlink control information, whereas the group of receivers may be determined based on the RNTI and/or the resource pool associated with the control channel transmission carrying the downlink control information. For example, a node may detect a downlink control information transmission by a Node-S with the Tx-UID field set to a value corresponding to another node. Hence, that node knows it is in receiving mode (Node-R).

For the unicast scenario, transmission parameters for the downlink control information may be uniquely configured for a pair of UEs. The Tx-UID and Rx-UID field are also uniquely assigned to each UE. For instance, the Tx-UID field may be assigned to a first UE and the Rx-UID field may be assigned to a second UE. A first value, e.g., zero, may indicate to transmit and a second value, e.g., one, may indicate to receive. Then [0,1] signals the first UE to transmit and signals the second UE to receive.

In this way, there is facilitated a scheduling procedure for three-party communication systems. Further described herein is how a HARQ procedure can be implemented. Note that in prior systems, HARQ is only defined for data transmissions. For example, a UE 140 may receive a PDCCH 240 and, subsequently, the associated PDSCH 241. However, the UE can fail to successfully decode the data carried on the PDSCH 241, and thus can indicate on a PUCCH to the base station 120 that reception of PDSCH 241 was unsuccessful. This triggers another PDCCH and associated PDSCH with a retransmission. In the event the UE 140 did not decode the PDCCH successfully, the UE 140 will not send a PUCCH indicating a discontinuous transmission (DTX) event to the base station, thereby also triggering a retransmission of the PDCCH and PDSCH.

In contrast, for three-party communications systems, the downlink control information is sent by the Node-S and the subsequent data transmission is sent by the Node-T. Hence, the scheduling Node-S needs to be informed about discontinuous transmission events at the Node-T, i.e., the scenario in which a Node-T did not successfully receive the downlink control information from the Node-S.

Figure 5:
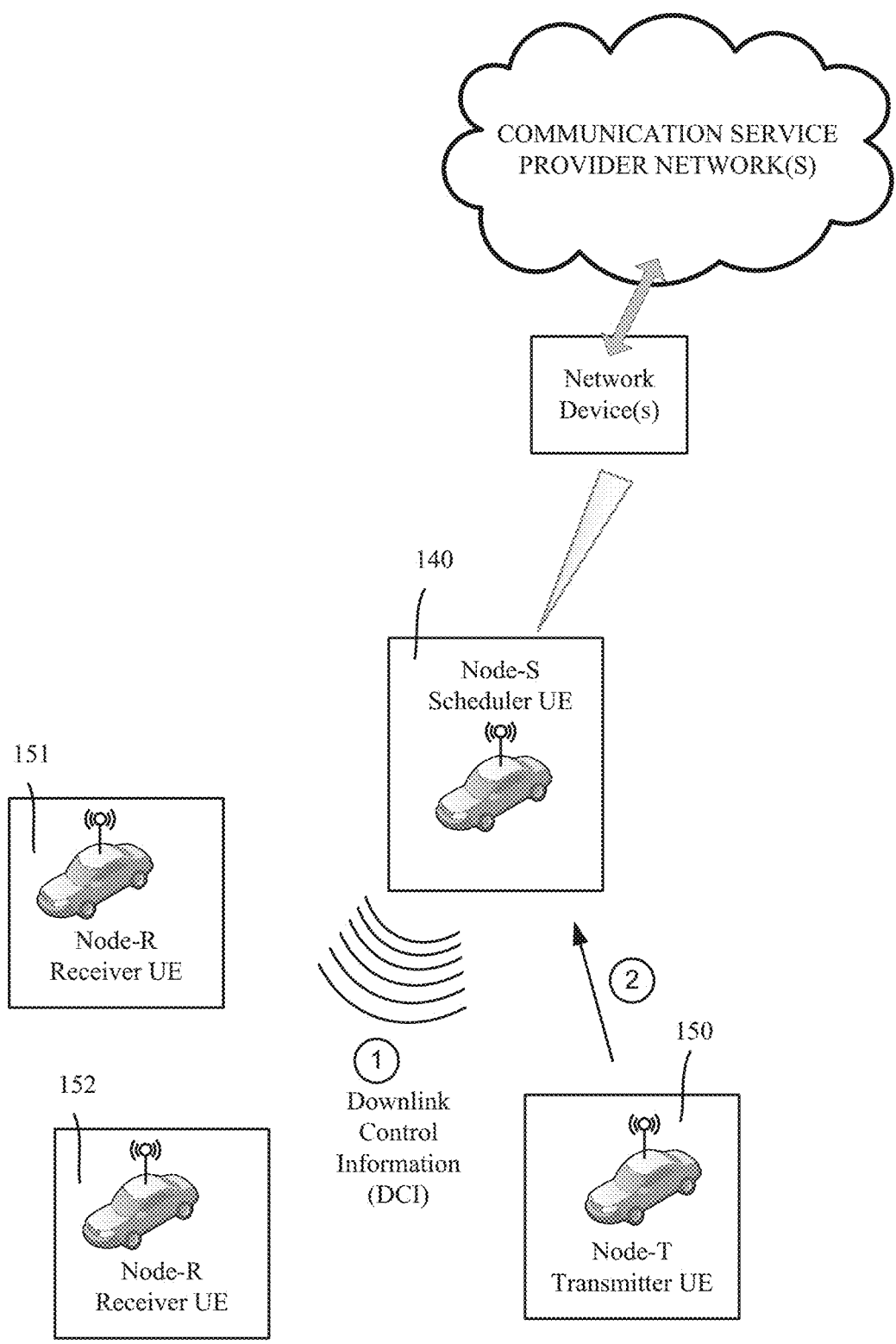
FIG. 5 is an example block diagram representing a local manager device (scheduler node device) sending downlink control information to a transmitter node, in which the transmitter node acknowledges receipt of the downlink control information, in accordance with various aspects and embodiments of the subject disclosure.

In one or more embodiments described herein, the Node-T sends an explicit acknowledgment to the Node-S as to whether the downlink control information (circled label 1 in FIG. 5) from Node-S was received successfully. If received successfully, the Node-S deems the downlink control information as having been successfully received (and the data transmission sent), and can thus continue other local manager and user equipment operations. If not received successfully, the Node-S retransmits corresponding downlink control information, e.g., identifying the same transmitter node-T and updating the scheduling (e.g. time slots) as appropriate. The detailed procedure can utilize one or more features of state-of-the-art systems, i.e., the downlink control information can indicate the resources for the transmission from Node-T to Node-S indicating whether the downlink control information was successfully decoded or not. Note that the solid line in FIG. 5 (circled label 2) represents such an explicit acknowledgement.

Figure 6:
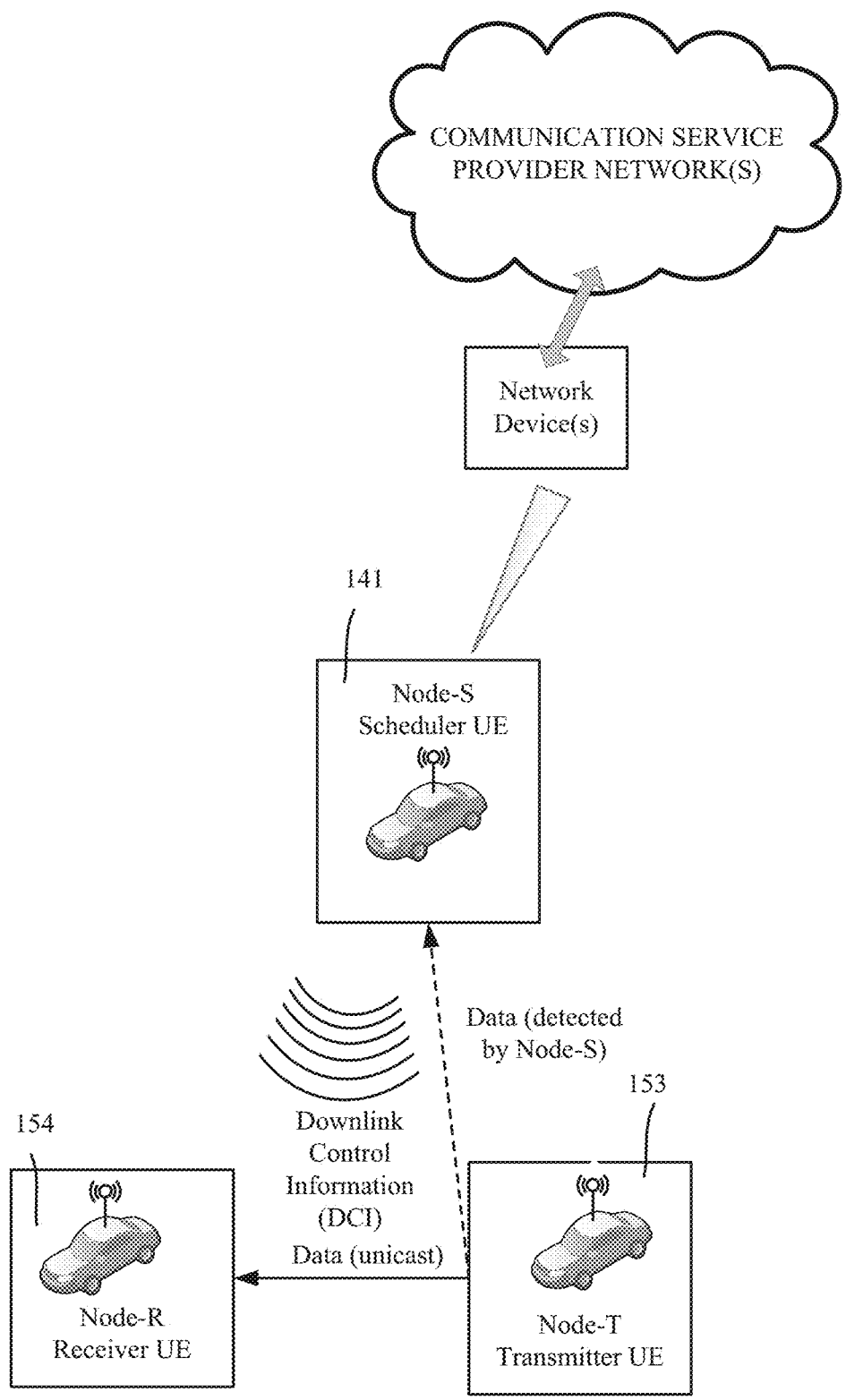
FIG. 6 is an example block diagram representing a local manager device (scheduler node device) detecting a transmission from a transmitter node to a receiver node, which acts as an implicit acknowledgment of the transmitter node having received downlink control information from the local manager device, in accordance with various aspects and embodiments of the subject disclosure.

In one or more alternative embodiments, the indication can be implicit. For example, as in FIG. 3 or 4, the Node-S may try to receive the data transmission from Node-T to Node-R scheduled by the downlink control information sent from Node-S to Node-T and Node-R. If Node-S can detect the data transmission, as in FIG. 6, the Node-S knows implicitly that Node-T received the downlink control information successfully, and can deem the sending of the downlink control information as successfully completed. Note that if not detected, then the Node-S can reschedule the data transmission via updated downlink control information; in the event that the Node-T had indeed successfully received the previous downlink control information and transmitted the data transmission, but the Node-S did not successfully detect the data transmission, the Node-T can explicitly indicate to the Node-S that the previous downlink control information was received and the data transmission was already sent.

Figure 7:
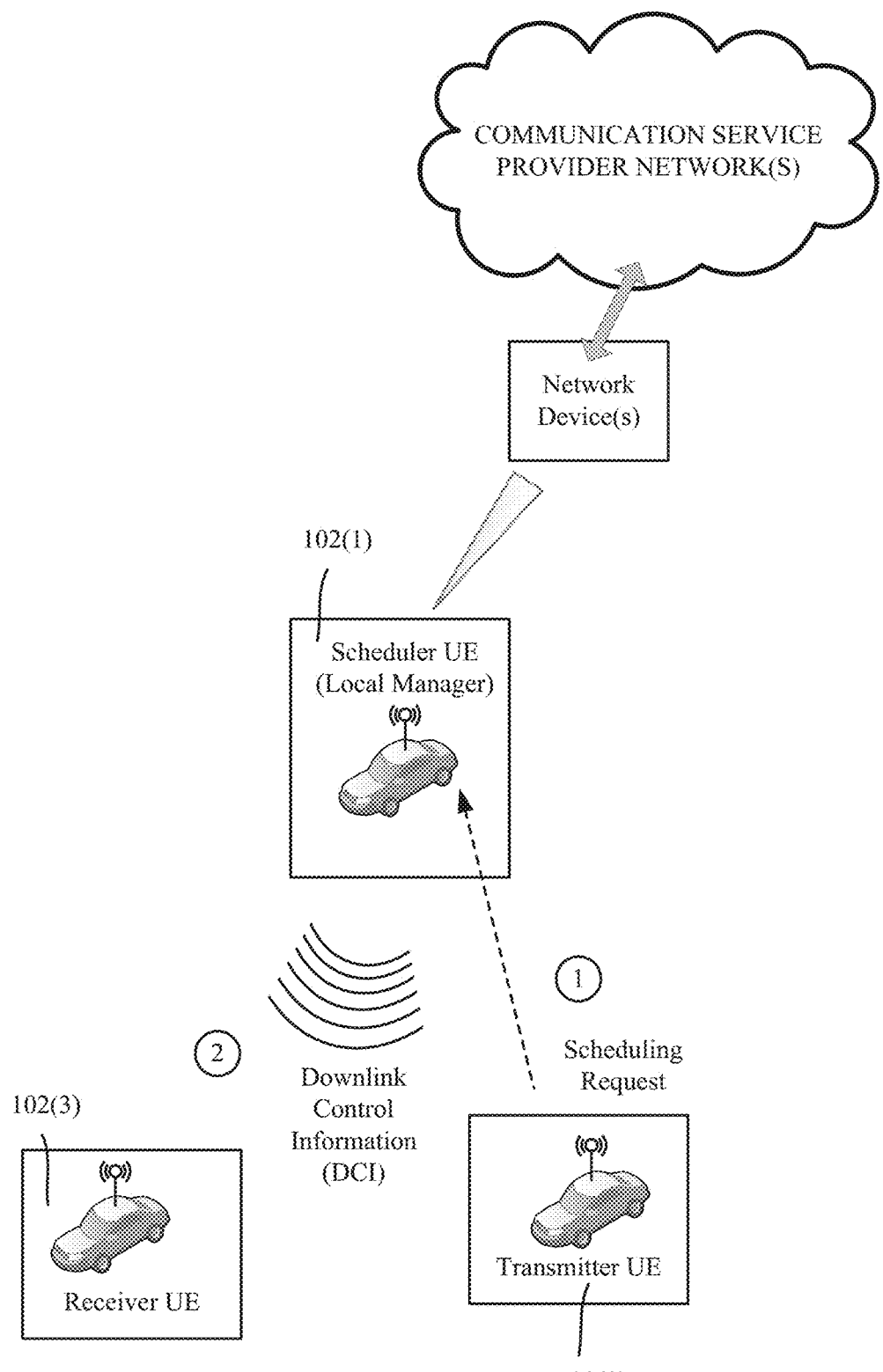
FIG. 7 is an example block diagram representing a transmitter node sending a scheduling request for transmission of data to a local manager device (scheduler node device) so as to obtain downlink control information from the local manager device that schedules the corresponding data transmission, in accordance with various aspects and embodiments of the subject disclosure.

Further, procedures are described herein that allow a Node-T to indicate to a Node-S that the Node-T has data to transmit via the sidelink to one or more Node-R(s). In one or more embodiments, periodic resources for scheduling requests (SRs) are configured by each Node-S, during which a Node-T can transmit to the Node-S (FIG. 7, arrow labeled one (1)) to indicate Node-T has data to transmit on the sidelink to one or more Node-R. Unlike prior systems, because the Node-S sends its downlink control information (arrow labeled two (2)) to both the Node-T and the Node-R (with three-party communications systems as described herein), the scheduling request needs to indicate the transmitting node and the receiving node(s). For multicast/broadcast, it may suffice to indicate the transmitting node in the scheduling request, as there is no single intended receiver. For unicast transmissions on the sidelink of a three-party communications system, however, the scheduling request needs to indicate both the transmitting node (Node-T) and the receiving node (Node-R).

The transmitting node is thus the node transmitting the scheduling request to the Node-S. For unicast transmissions on the sidelink, it is beneficial for the Node-T sending the scheduling request to know whether a given intended Node-R is under the control of a given Node-S. In one or more embodiments, the Node-S broadcasts the set of nodes under its control, e.g., periodically or on demand Subsequently, when the Node-T sends the scheduling request in addition to its own identifier, the Node-T can include the identifier of the intended receiver (Node-R) in the scheduling request. The scheduling request can be received either by a single Node-S or by a plurality of Node-S's depending on how the base station 120 configures the Node-S's 140, 141 (via the links 160, 161) with scheduling request resources. In the event that a scheduling request transmission can be received by a plurality of Node-S's, the set of potential Node-R(s) for unicast transmissions can be broadcast by the base station 120 rather than by a Node-S.

As can be seen, the technology described herein facilitates data communication in a three-party wireless communication system having a scheduling node, transmitting node and receiving node(s). The technology includes common DCI broadcasts/multicasts, an explicit or implicit acknowledgement subsystem, and scheduling request operations.

Figure 8:
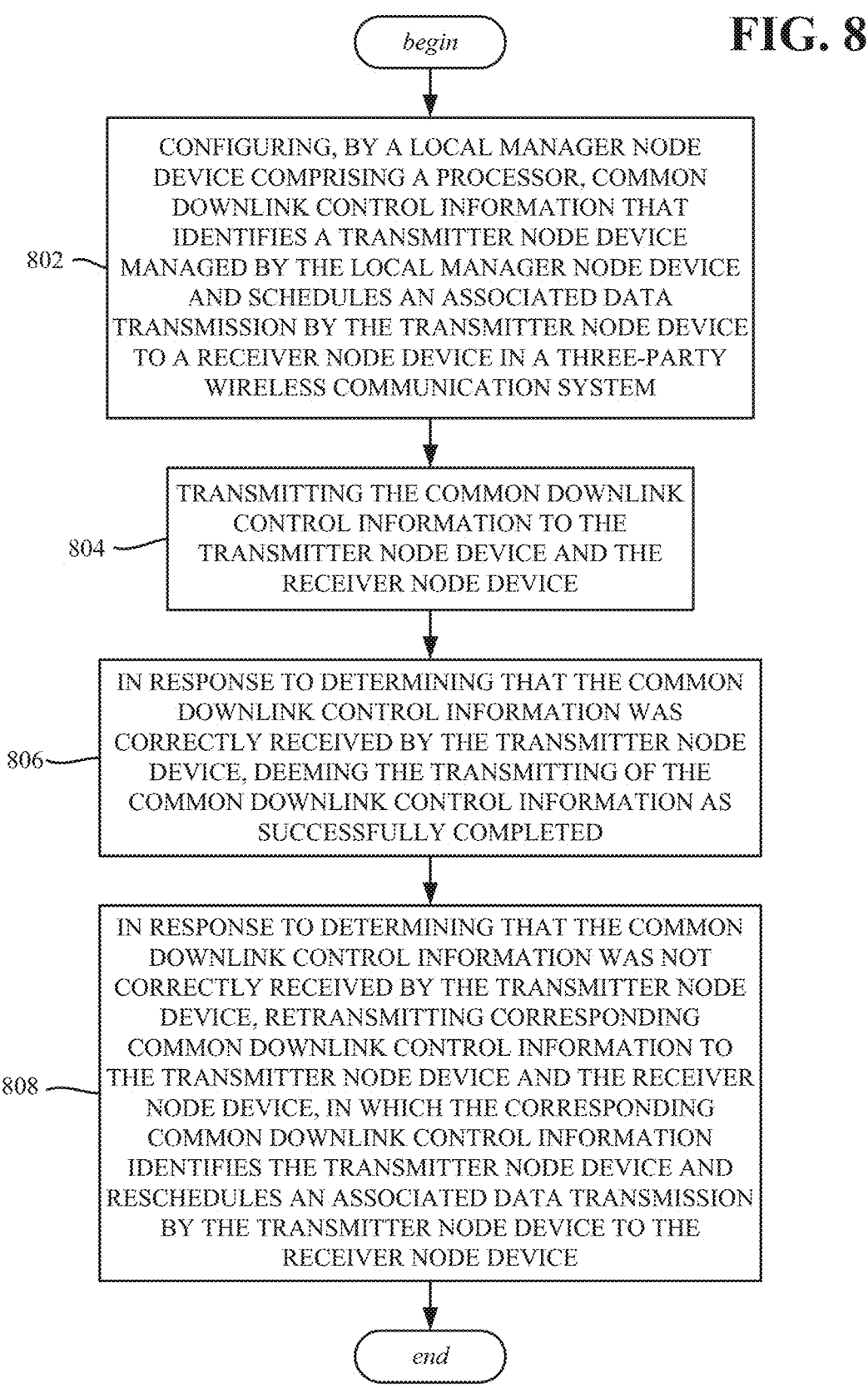
FIG. 8 illustrates example operations of a local manager node device, in accordance with various aspects and embodiments of the subject disclosure.

One or more aspects, such as those implemented in example operations (e.g., performed by local manager node device comprising a processor) of a method, are represented in FIG. 8, and are directed towards configuring (operation 802) common downlink control information that identifies a transmitter node device managed by the local manager node device and schedules an associated data transmission by the transmitter node device to a receiver node device in a three-party wireless communication system. Operation 804 represents transmitting the common downlink control information to the transmitter node device and the receiver node device. Operation 806 represents, in response to determining that the common downlink control information was correctly received by the transmitter node device, deeming the transmitting of the common downlink control information as successfully completed. Operation 808 represents, in response to determining that the common downlink control information was not correctly received by the transmitter node device, retransmitting corresponding common downlink control information to the transmitter node device and the receiver node device, in which the corresponding common downlink control information identifies the transmitter node device and reschedules an associated data transmission by the transmitter node device to the receiver node device.

Aspects can comprise, receiving, by the local manager, an explicit acknowledgment from the transmitting device indicating that the common downlink control information was successfully received by the transmitting device, and wherein the determining that the common downlink control information was correctly received by the transmitter node device is based on the explicit acknowledgment.

Aspects can comprise detecting, by the local manager, a data transmission from the transmitter node device that corresponds to the common downlink control information, and using the detecting as an implicit acknowledgment that the common downlink control information was correctly received by the transmitter node device, wherein the determining that the common downlink control information was correctly received by the transmitter node device is based on the implicit acknowledgment.

Configuring the common downlink control information can comprise adding a transmitter unique identifier that represents the transmitter node device to a transmitter unique identifier field in the common downlink control information.

The data transmission can comprise a unicast data transmission, and wherein the configuring the common downlink control information can comprise identifying the receiver node device in the common downlink control information.

Configuring the common downlink control information can comprise adding a transmitter unique identifier that represents the transmitter node device to a transmitter unique identifier field and adding a receiver unique identifier that represents the receiver node device to a receiver unique identifier field in the common downlink control information.

Aspects can comprise receiving, by the local manager node device, a scheduling request from the transmitter node device, and configuring the common downlink control information and the transmitting the common downlink control information can occur in response to the scheduling request.

The local manager node device can comprise a first local manager node device in a cell; aspects can comprise receiving, by the local manager node device from a base station, a first radio network temporary identifier that is different from a second radio network temporary identifier of a second local manager node device in the cell. The first radio network temporary identifier can be used for sidelink transmissions of the local manager node device, the transmitter node device and at least one receiver node device that is managed by the manager node device.

The local manager node device can comprise a first local manager node device in a cell; aspects can comprise receiving, by the local manager node device from a base station, a radio network temporary identifier for sidelink transmissions that is shared with second local manager node device in the cell, wherein resource pools of the first local manager node device and the second local manager node device are orthogonal. The radio network temporary identifier can be used for sidelink transmissions of the local manager node device, the transmitter node device and at least one receiver node device that is managed by the manager node device.

Figure 9:
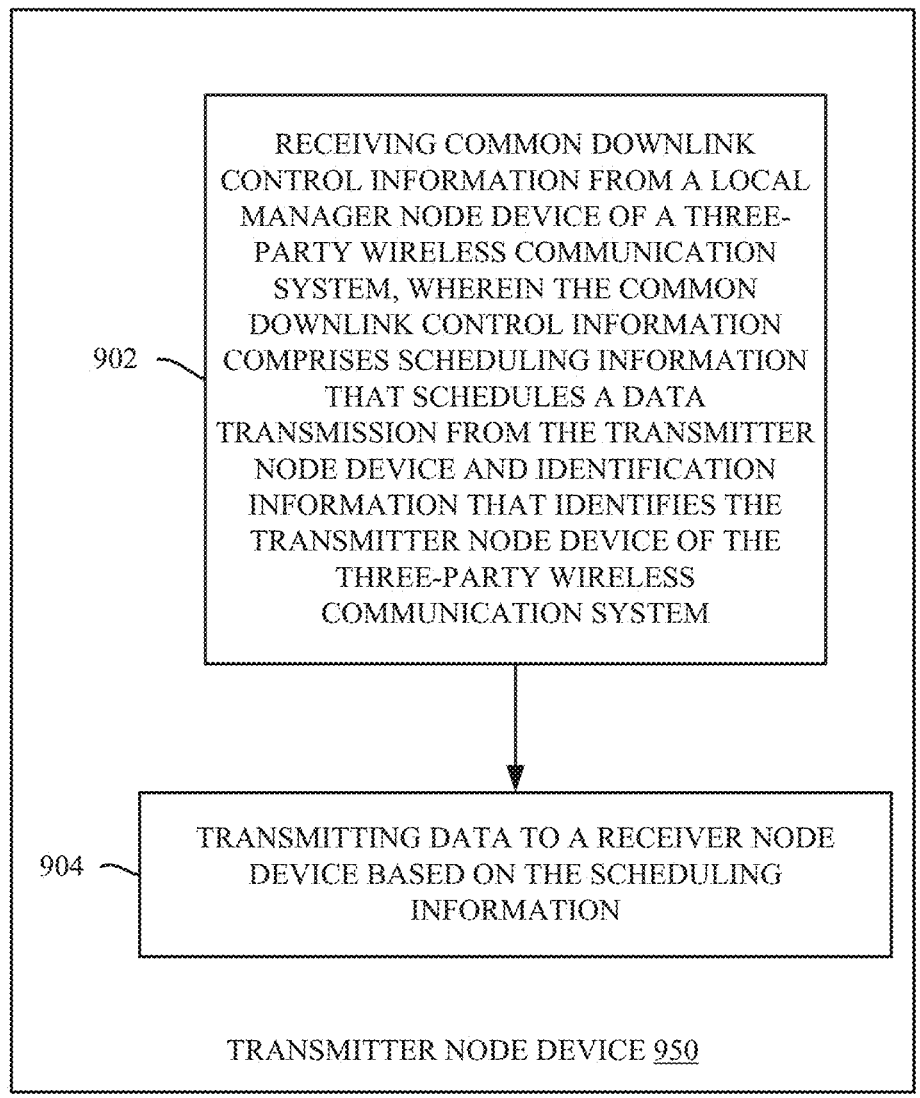
FIG. 9 illustrates example operations of a transmitter node device, in accordance with various aspects and embodiments of the subject disclosure.

One or more example aspects are represented in FIG. 9, and can correspond to a transmitter node device 950, comprising a processor, and a memory that stores executable instructions that, when executed by the processor, facilitate performance of operations. Example operation 902 represents receiving common downlink control information from a local manager node device of a three-party wireless communication system, wherein the common downlink control information comprises scheduling information that schedules a data transmission from the transmitter node device and identification information that identifies the transmitter node device of the three-party wireless communication system; Example operation 904 represent transmitting data to a receiver node device based on the scheduling information.

Further operations can comprise determining that the common downlink control information was correctly received, and in response to the determining, acknowledging, by the transmitter node device to the local manager node device, receiving the common downlink control information.

Receiving the common downlink control information can comprise utilizing a sidelink interface. Transmitting the data to the receiver node device can comprise utilizing a sidelink interface.

Further operations can comprise transmitting a scheduling request to the local manager node device, wherein receiving the common downlink control information is in response to the scheduling request. The scheduling request can identify the receiver node device, and the common downlink control information further can identify the receiver node device. The scheduling request can identify the receiver node device for a unicast transmission, and the common downlink control information can identify the transmitter node device in a transmitter unique identifier field and can identify the receiver node device in a receiver unique identifier field.

Figure 10:
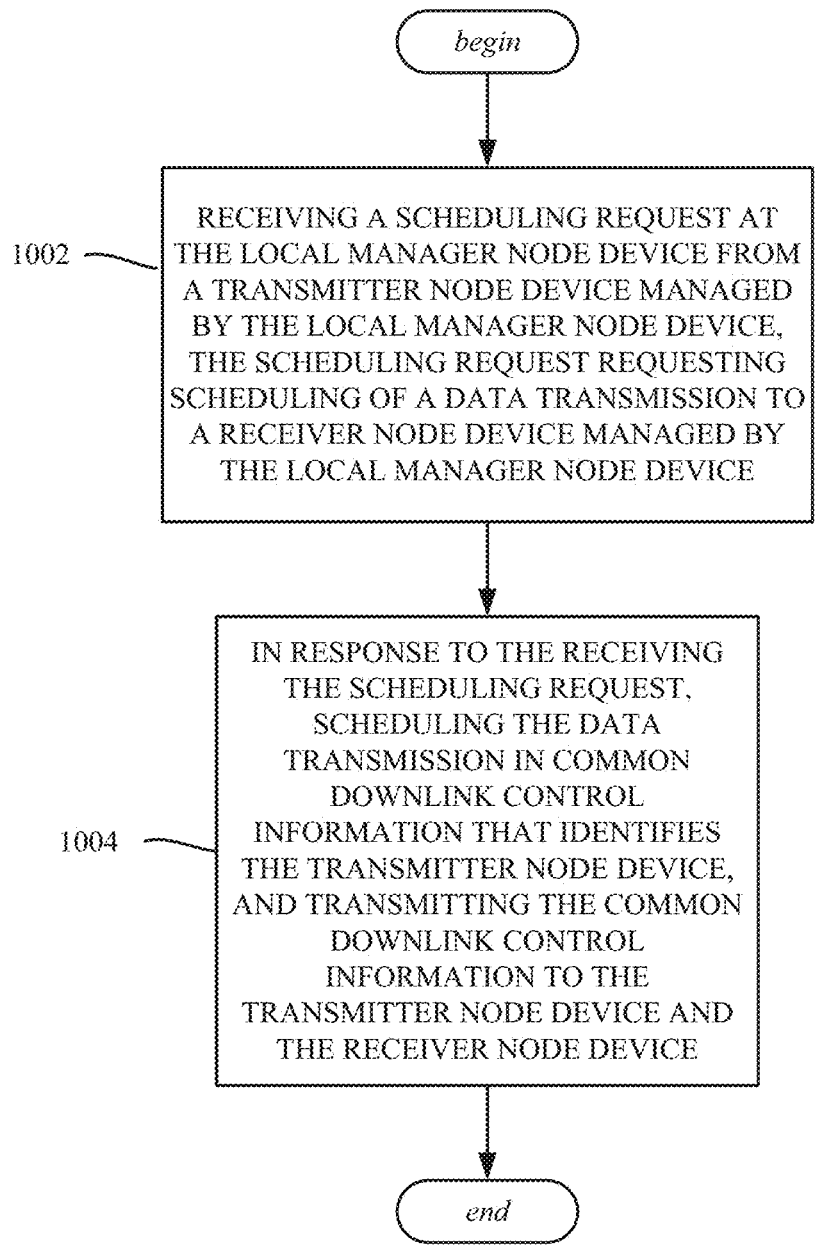
FIG. 10 illustrates example operations of a local manager node device that receives a scheduling request, in accordance with various aspects and embodiments of the subject disclosure.

One or more aspects, such as implemented in a machine-readable storage medium, comprising executable instructions that, when executed by a processor, facilitate performance of example operations, are represented in FIG. 10. Operation 1002 represents receiving a scheduling request at the local manager node device from a transmitter node device managed by the local manager node device, the scheduling request requesting scheduling of a data transmission to a receiver node device managed by the local manager node device. Operation 1002 represents, in response to the receiving the scheduling request, scheduling the data transmission in common downlink control information that identifies the transmitter node device, and transmitting the common downlink control information to the transmitter node device and the receiver node device.

Further operations can comprise broadcasting information that identifies a group of nodes managed by the local manager node device. Further operations can comprise receiving an acknowledgment from the transmitter node device in response to the transmitting the common downlink control information. Further operations can comprise detecting the data transmission from the transmitter node device as an implicit acknowledgement that the common downlink control information was successfully received at the transmitter node device.

As can be seen, there is described herein a technology by which nodes in a three party communication system can communicate. A local manager/scheduler node sends common downlink control information to a transmitting node and one or more receiving node(s) that schedules a data transmission, via sidelink, from the transmitting node to the receiving node. The transmitting node can explicitly or implicitly acknowledge reception of the downlink control information. The technology facilitates unicast and broadcast/multicast data transmissions. The transmitting node can request the scheduling of the data transmission, e.g., identifying the receiving node for a unicast data transmission.

A wireless communication system can employ various cellular systems, technologies, and modulation schemes to facilitate wireless radio communications between devices (e.g., a UE and the network device). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network device) of the system are configured to communicate wireless signals using one or more multi carrier modulation schemes, wherein data symbols can be transmitted simultaneously over multiple frequency sub-carriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 11:
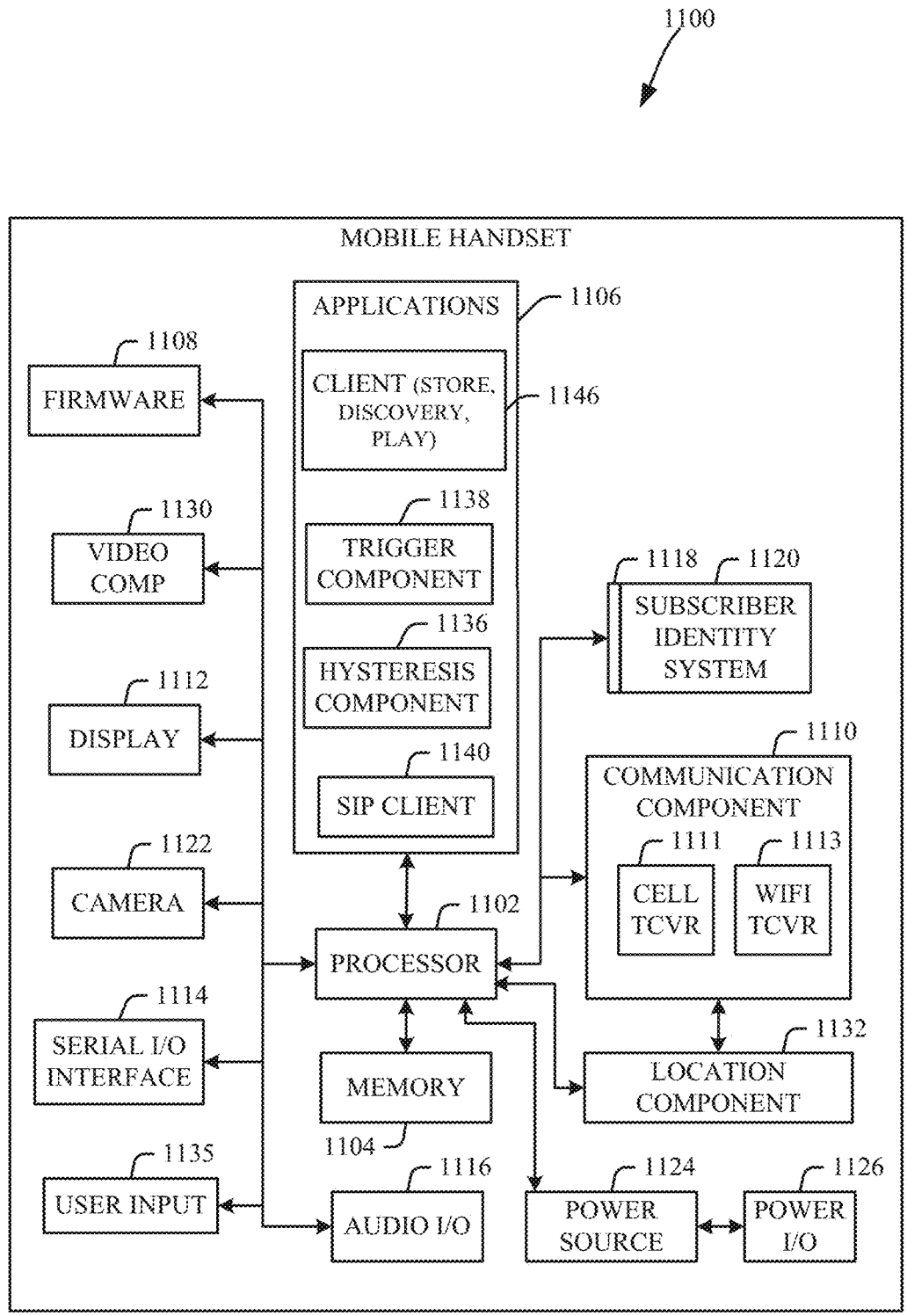
FIG. 11 illustrates an example block diagram of an example mobile handset operable to engage in a system architecture that facilitates wireless communications according to one or more embodiments described herein.

Referring now to FIG. 11, illustrated is a schematic block diagram of an example end-user device such as a user equipment) that can be a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
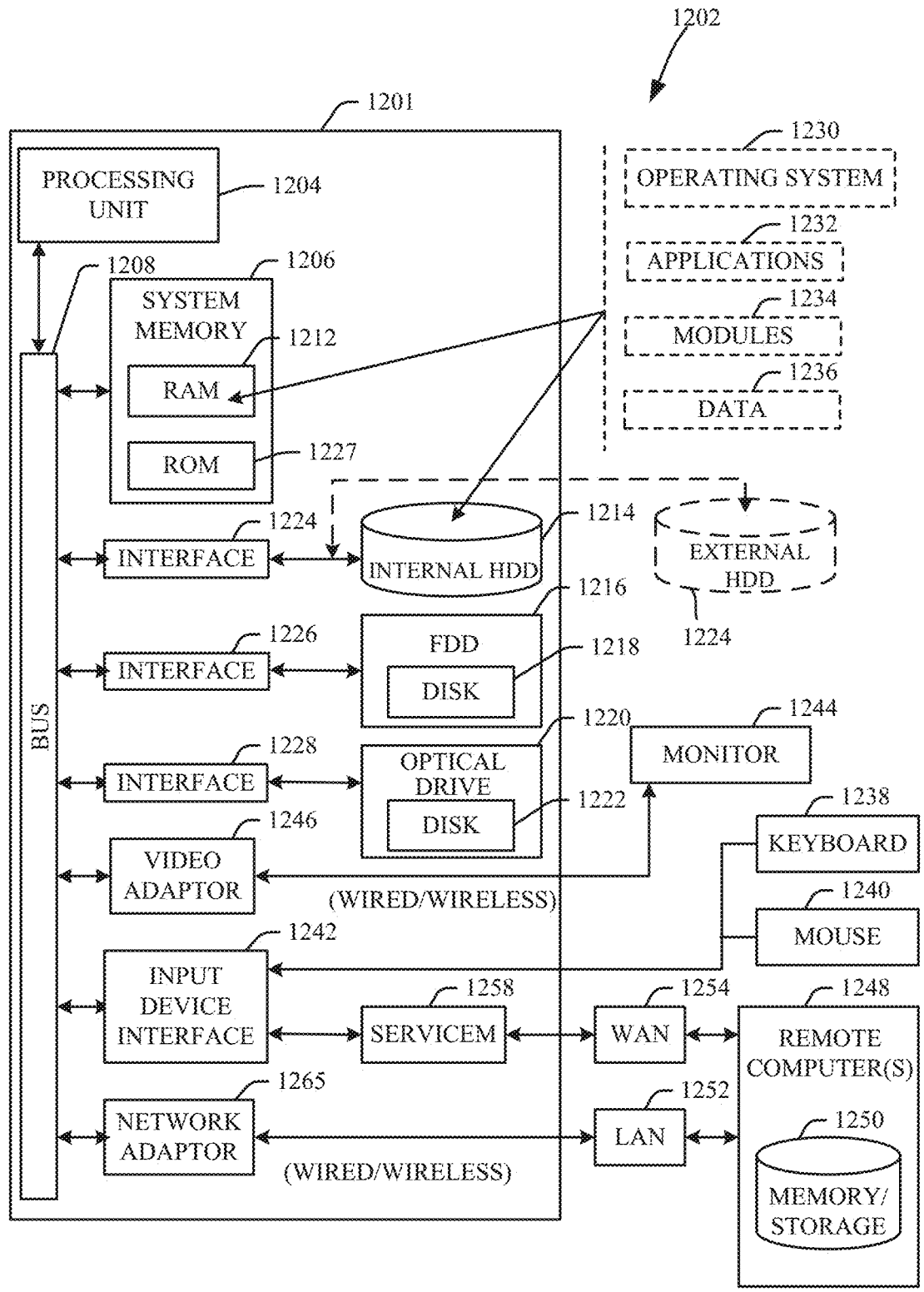
FIG. 12 illustrates an example block diagram of an example computer operable to engage in a system architecture that facilitates wireless communications according to one or more embodiments described herein.

Referring now to FIG. 12, there is illustrated a block diagram of a computer 1200 operable to execute the functions and operations performed in the described example embodiments. For example, a network node (e.g., network node 126, GNB 202, etc.) may contain components as described in FIG. 12. The computer 1200 can provide networking and communication capabilities between a wired or wireless communication network and a server and/or communication device. In order to provide additional context for various aspects thereof, FIG. 1 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the various embodiments can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 12 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
   configuring, by a local manager node device comprising a processor, common downlink control information that identifies a transmitter node device managed by the local manager node device and schedules an associated data transmission by the transmitter node device to a receiver node device in a three-party wireless communication system;
   transmitting, by the local manager node device, the common downlink control information to the transmitter node device and the receiver node device;
   in response to determining that the common downlink control information was correctly received by the transmitter node device, deeming, by the local manager node device, the transmitting of the common downlink control information as successfully completed; and
   in response to determining that the common downlink control information was not correctly received by the transmitter node device, retransmitting, by the local manager node device, corresponding common downlink control information to the transmitter node device and the receiver node device, in which the corresponding common downlink control information identifies the transmitter node device and reschedules the associated data transmission by the transmitter node device to the receiver node device.

2. The method of claim 1, further comprising, receiving, by the local manager node device, an explicit acknowledgment from the transmitter node device indicating that the common downlink control information was successfully received by the transmitter node device, and wherein determining that the common downlink control information was correctly received by the transmitter node device is based on the explicit acknowledgment.

3. The method of claim 1, further comprising, detecting, by the local manager node device, a data transmission from the transmitter node device that corresponds to the common downlink control information, and using the detecting as an implicit acknowledgment that the common downlink control information was correctly received by the transmitter node device, wherein determining that the common downlink control information was correctly received by the transmitter node device is based on the implicit acknowledgment.

4. The method of claim 1, wherein configuring the common downlink control information comprises adding a transmitter unique identifier that represents the transmitter node device to a transmitter unique identifier field in the common downlink control information.

5. The method of claim 1, wherein the associated data transmission comprises a unicast data transmission, and wherein configuring the common downlink control information further comprises identifying the receiver node device in the common downlink control information.

6. The method of claim 5, wherein configuring the common downlink control information comprises adding a transmitter unique identifier that represents the transmitter node device to a transmitter unique identifier field and adding a receiver unique identifier that represents the receiver node device to a receiver unique identifier field in the common downlink control information.

7. The method of claim 1, further comprising receiving, by the local manager node device, a scheduling request from the transmitter node device, and wherein configuring the common downlink control information and transmitting the common downlink control information occurs in response to the scheduling request.

8. The method of claim 1, wherein the local manager node device is a first local manager node device in a cell, and further comprising receiving, by the first local manager node device from a base station, a first radio network temporary identifier that is different from a second radio network temporary identifier of a second local manager node device in the cell, and wherein the first radio network temporary identifier is used for sidelink transmissions of the first local manager node device, the transmitter node device and at least one receiver node device that is managed by the first local manager node device.

9. The method of claim 1, wherein the local manager node device is a first local manager node device in a cell, and further comprising receiving, by the first local manager node device from a base station, a radio network temporary identifier for sidelink transmissions that is shared with a second local manager node device in the cell, wherein resource pools of the first local manager node device and the second local manager node device are orthogonal, and wherein the radio network temporary identifier is used for sidelink transmissions of the first local manager node device, the transmitter node device and at least one receiver node device that is managed by the first local manager node device.

10. A local manager user equipment, comprising:
    a processor; and
    a memory that stores executable instructions that, when executed by the processor, facilitate performance of operations, the operations comprising:
      configuring common downlink control information that identifies a transmitter user equipment managed by the local manager user equipment and schedules an associated data transmission by the transmitter user equipment to a receiver user equipment in a three-party communication system;
      transmitting the common downlink control information to the transmitter user equipment and the receiver user equipment;
      in response to determining that the common downlink control information was correctly received by the transmitter user equipment, deeming the transmitting of the common downlink control information as successfully completed; and
      in response to determining that the common downlink control information was incorrectly received by the transmitter user equipment, retransmitting corresponding common downlink control information to the transmitter user equipment and the receiver user equipment, in which the corresponding common downlink control information identifies the transmitter user equipment and reschedules the associated data transmission by the transmitter user equipment to the receiver user equipment.

11. The local manager user equipment of claim 10, wherein the operations further comprise receiving an explicit acknowledgment from the transmitter user equipment indicating that the common downlink control information was successfully received by the transmitter user equipment, and wherein determining that the common downlink control information was correctly received by the transmitter user equipment is based on the explicit acknowledgment.

12. The local manager user equipment of claim 10, wherein the operations further comprise detecting a data transmission from the transmitter user equipment that corresponds to the common downlink control information, and using the detecting as an implicit acknowledgment that the common downlink control information was correctly received by the transmitter user equipment, wherein determining that the common downlink control information was correctly received by the transmitter user equipment is based on the implicit acknowledgment.

13. The local manager user equipment of claim 10, wherein configuring the common downlink control information comprises adding a transmitter unique identifier that represents the transmitter user equipment to a transmitter unique identifier field in the common downlink control information.

14. The local manager user equipment of claim 10, wherein the associated data transmission comprises a unicast data transmission, and wherein configuring the common downlink control information further comprises identifying the receiver user equipment in the common downlink control information.

15. The local manager user equipment of claim 14, wherein configuring the common downlink control information comprises adding a transmitter unique identifier that represents the transmitter user equipment to a transmitter unique identifier field and adding a receiver unique identifier that represents the receiver user equipment to a receiver unique identifier field in the common downlink control information.

16. The local manager user equipment of claim 10, wherein the operations further comprise receiving a scheduling request from the transmitter user equipment, and wherein configuring the common downlink control information and transmitting the common downlink control information occurs in response to the scheduling request.

17. The local manager user equipment of claim 10, wherein the local manager user equipment is a first local manager user equipment in a cell, and the operations further comprise receiving, from a base station, a first radio network temporary identifier that is different from a second radio network temporary identifier of a second local manager user equipment in the cell, and wherein the first radio network temporary identifier is used for sidelink transmissions of the first local manager user equipment, the transmitter user equipment and at least one receiver user equipment that is managed by the first local manager user equipment.

18. The local manager user equipment of claim 10, wherein the local manager user equipment is a first local manager user equipment in a cell, and the operations further comprise receiving, from a base station, a radio network temporary identifier for sidelink transmissions that is shared with a second local manager user equipment in the cell, wherein resource pools of the first local manager user equipment and the second local manager user equipment are orthogonal, and wherein the radio network temporary identifier is used for sidelink transmissions of the first local manager user equipment, the transmitter user equipment and at least one receiver user equipment that is managed by the first local manager user equipment.

19. A non-transitory machine-readable medium, comprising executable instructions that, when executed by a processor of a local manager device, facilitate performance of operations, the operations comprising:
configuring common downlink control information that identifies a transmitter device managed by the local manager device and schedules an associated data transmission by the transmitter device to a receiver device in a three-party wireless communication system;
transmitting the common downlink control information to the transmitter device and the receiver device;
in response to determining that the common downlink control information was correctly received by the transmitter device, deeming the transmitting of the common downlink control information as successfully completed; and
in response to determining that the common downlink control information was incorrectly received by the transmitter device, retransmitting corresponding common downlink control information to the transmitter device and the receiver device, in which the corresponding common downlink control information identifies the transmitter device and reschedules the associated data transmission by the transmitter device to the receiver device.

20. The non-transitory machine-readable medium of claim 19, wherein the operations further comprise receiving an explicit acknowledgment from the transmitter device indicating that the common downlink control information was successfully received by the transmitter device, and wherein determining that the common downlink control information was correctly received by the transmitter device is based on the explicit acknowledgment.

* * * * *